(12) United States Patent
Frebourg

(10) Patent No.: US 10,843,440 B2
(45) Date of Patent: Nov. 24, 2020

(54) LAMINATED GLAZING WITH RECESSED VERY THIN INTERIOR GLASS

(71) Applicant: SAINT-GOBAIN GLASS FRANCE, Courbevoie (FR)

(72) Inventor: Philippe Frebourg, Senlis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 31 days.

(21) Appl. No.: 16/317,390

(22) PCT Filed: Jul. 12, 2017

(86) PCT No.: PCT/EP2017/067573
§ 371 (c)(1),
(2) Date: Jan. 11, 2019

(87) PCT Pub. No.: WO2018/011278
PCT Pub. Date: Jan. 18, 2018

(65) Prior Publication Data
US 2019/0224948 A1    Jul. 25, 2019

(30) Foreign Application Priority Data

Jul. 12, 2016 (FR) ..................... 16 56703

(51) Int. Cl.
*B32B 7/02* (2019.01)
*B32B 17/10* (2006.01)

(52) U.S. Cl.
CPC .... *B32B 17/10036* (2013.01); *B32B 17/1077* (2013.01); *B32B 17/1099* (2013.01); *B32B 17/10137* (2013.01); *B32B 17/10293* (2013.01); *B32B 17/10761* (2013.01); *B32B 17/10788* (2013.01); *B32B 17/10917* (2013.01)

(58) Field of Classification Search
CPC ........ B32B 17/10036; B32B 17/10137; B32B 17/10293; B32B 17/10761; B32B 17/1077; B32B 17/10788; B32B 17/10917; B32B 17/1099
See application file for complete search history.

(56) References Cited

FOREIGN PATENT DOCUMENTS

| EP | 0 418 123 A1 | 3/1991 |
|---|---|---|
| EP | 0 600 766 A1 | 6/1994 |
| FR | 2 000 890 A1 | 9/1969 |
| FR | 3 012 073 A1 | 4/2015 |

(Continued)

OTHER PUBLICATIONS

Hatakeyama (JP 2007197288 A machine translation), Aug. 9, 2007. (Year: 2007).*

(Continued)

*Primary Examiner* — Lawrence D Ferguson
(74) *Attorney, Agent, or Firm* — Pillsbury Winthrop Shaw Pittman LLP

(57) ABSTRACT

A laminated glazing includes two sheets of glass and a polymer interlayer positioned between them. The first sheet of glass is thicker than the second sheet of glass the thickness of which is less than 1.2 mm. The edge of the second sheet of glass is recessed with respect to the edge of the first sheet of glass over all or part of the periphery of the glazing, thereby making it possible to protect the more fragile second sheet of glass from mechanical knocks against the edge face of the glazing.

18 Claims, 4 Drawing Sheets

(56) References Cited

FOREIGN PATENT DOCUMENTS

| | | |
|---|---|---|
| JP | 2007-197288 A | 8/2007 |
| WO | WO 95/00329 A1 | 1/1995 |
| WO | WO 00/61366 A1 | 10/2000 |
| WO | WO 2014/029605 A1 | 2/2014 |

OTHER PUBLICATIONS

International Search Report as issued in International Patent Application No. PCT/EP2017/067573, dated Sep. 29, 2017.

* cited by examiner

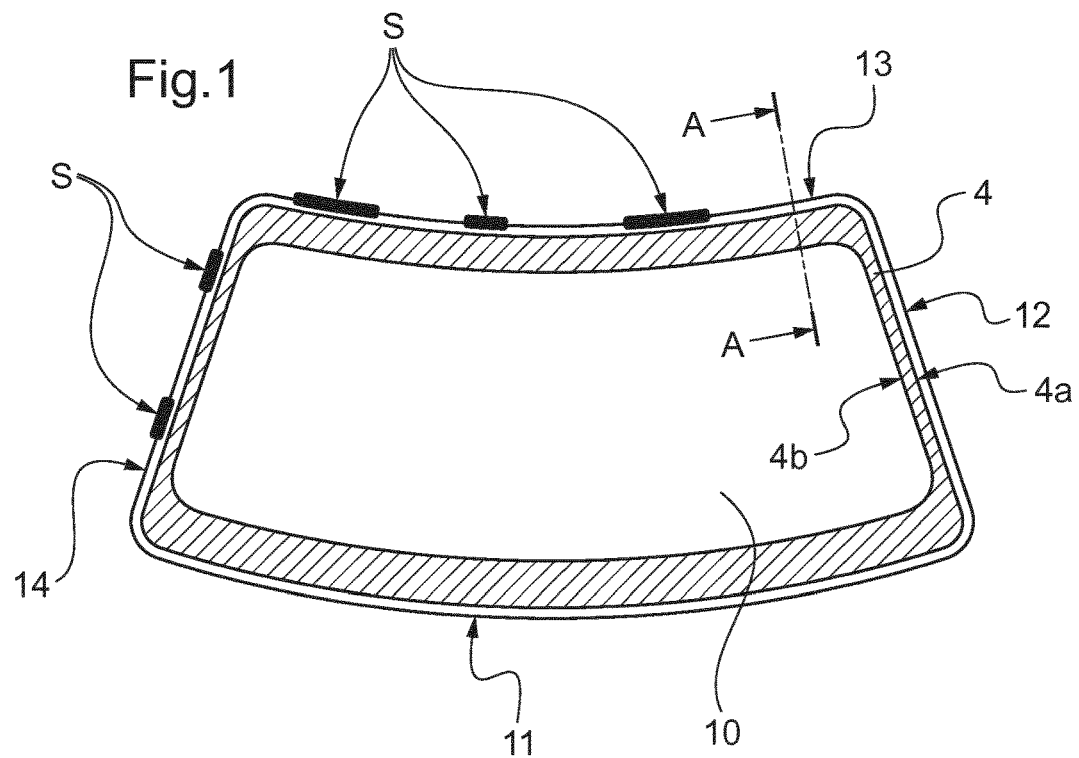
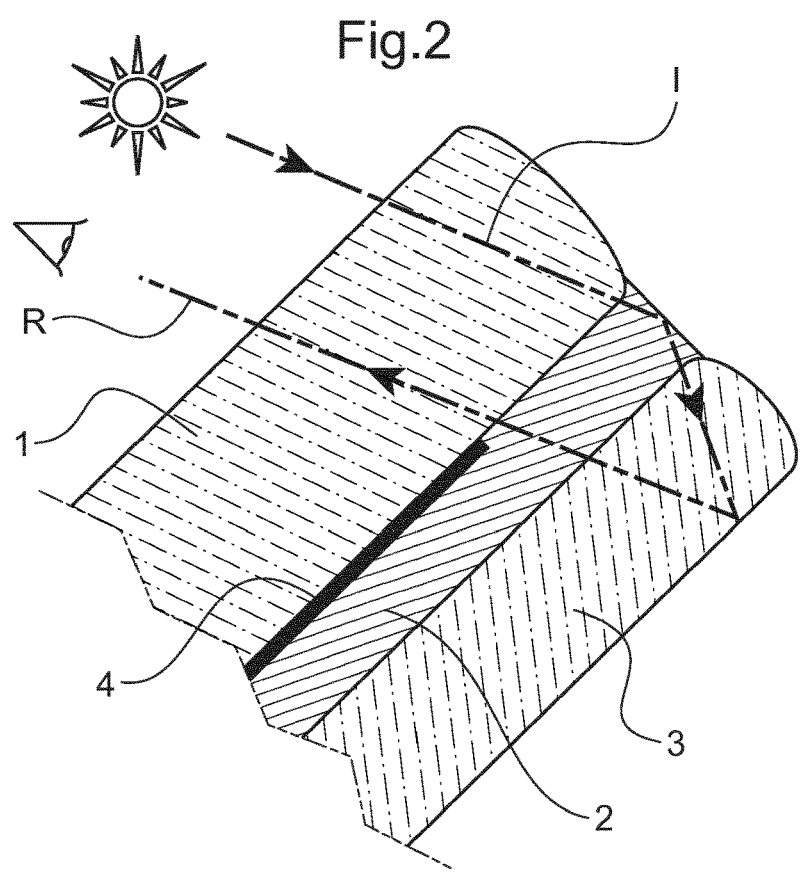

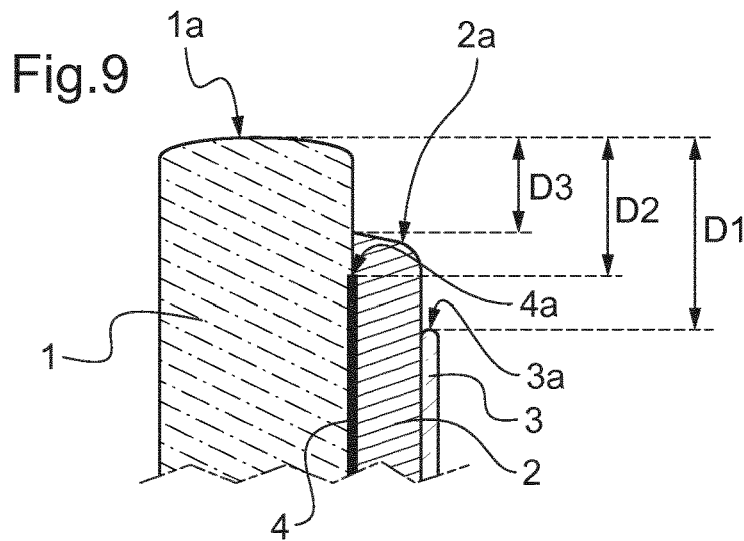
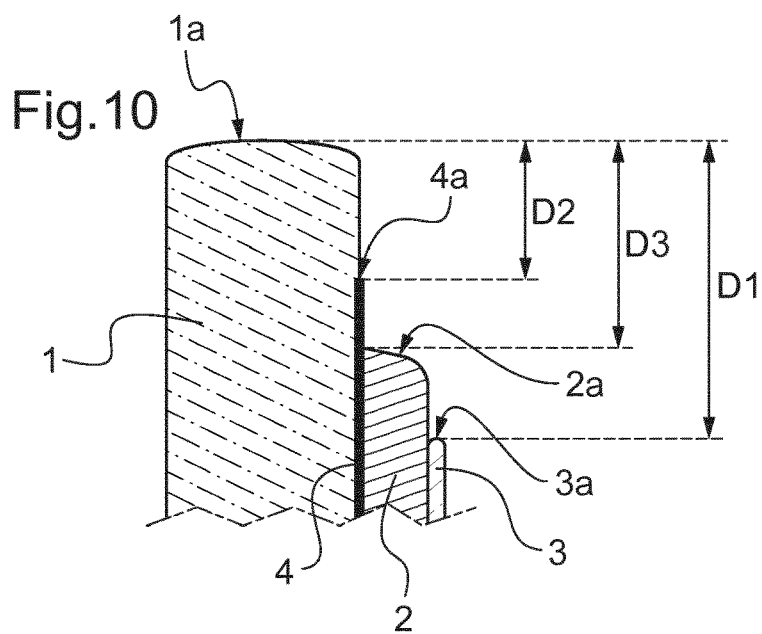
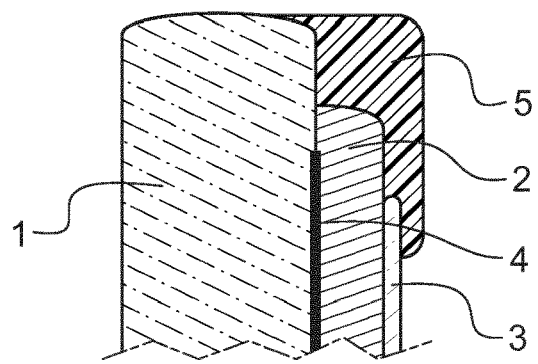
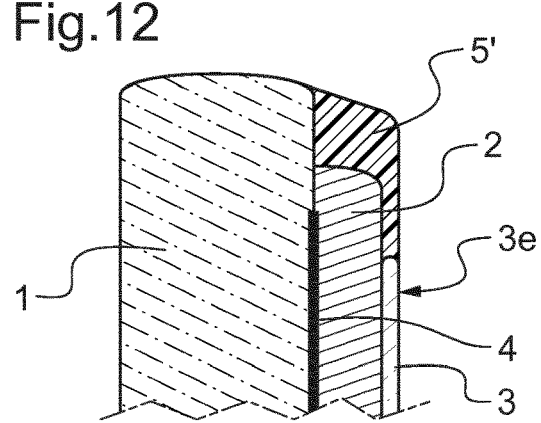

LAMINATED GLAZING WITH RECESSED VERY THIN INTERIOR GLASS

CROSS-REFERENCE TO RELATED APPLICATIONS

This application is the U.S. National Stage of PCT/EP2017/067573, filed Jul. 12, 2017, which in turn claims priority to French patent application number 1656703 filed Jul. 12, 2016. The content of these applications are incorporated herein by reference in their entireties.

The present invention relates to the field of laminated glazing in particular for automotive applications.

Laminated glazings are commonly used in the field of automotive vehicles, aeronautical engineering and building. They are generally made up of an exterior sheet of glass and of an interior sheet of glass between which is positioned a sheet of thermoplastic—for example made of polyvinylbutyral (PVB)—which bonds them together.

In the automotive field, laminated glazings have long been used as what is known as "safety" glazing to create windshields because of their ability to hold the pieces of glass together if the sheets of glass break as a result of a mechanical impact on the surface of the windshield. They are now also used for side glazing, roof glazing and the back window glazing of motor vehicles, for reasons of acoustic comfort and safety.

The exterior sheet of glass is generally thicker than the interior sheet of glass in order to provide adequate resistance to stone chip impact and potential mechanical impacts on its surface. The current trend is to use interior sheets of glass of ever decreasing thickness with a view to lightening the weight of the glazings. Whereas the exterior sheets of glass generally have a thickness of 1.4 mm to 2.1 mm, it is desirable to use extremely thin interior sheets of glass, having a thickness less than or equal to 1.2 mm or even less than or equal to 1 mm, or actually even less than or equal to 0.7 mm.

The very thin interior sheets of glass are intrinsically very fragile and extremely sensitive to mechanical knocks. As a result, they are handled with care during the phases of manufacture of the laminated glazing. Once the laminated glazing has been produced, they are protected against mechanical impact applied to their surface because of the fact that they are assembled with the sheet of thermoplastic and the exterior sheet of glass. Furthermore, the mechanical strength of the interior sheets of glass can be improved by chemical toughening.

In the context of the present invention, the Applicant Company has, however, identified a hitherto misunderstood particular problem relating to these laminated glazings with very thin interior sheets of glass. Specifically, it would seem that the very thin sheets of glass are particularly fragile with regard to mechanical knocks or other mechanical stress loadings applied to their edge face. In addition, it would seem that while chemical toughening appreciably improves resistance to mechanical impacts applied to the main surface of the sheet of glass, the same is not true in respect of mechanical knocks applied to the edge face thereof.

As a result, an operation—manual or automated, of using a knife to trim off the marginal part of the thermoplastic film which protrudes beyond the periphery of the glazing after the sheets of glass and the sheet of thermoplastic have been assembled is difficult if not to say impossible to perform because it comes with a risk that the knife will impact against the edge face of the interior sheet of glass. It is possible to resort to thermoplastic films which are precut to the appropriate dimensions in order to avoid such a trimming operation, but this is accompanied by the disadvantage of requiring accurate precutting and accurate positioning when assembling it with the sheets of glass.

Furthermore, another difficulty affects glazings the edge of which is visible after mounting on the motor vehicle, and which have an opaque band running along the edge of the glazing, something which is usually the case for windshields and for automotive glazings other than the side window glazings sliding in the doors. This opaque band generally has the function of hiding the automotive vehicle bodywork underneath the edge of the glazing and of protecting the bead of adhesive used to fix the glazing to the bodywork from ultraviolet radiation. In such a case, it is preferable to resort to a technique of eliminating the edge brightness effect by some way other than by texturizing the edge face of the thermoplastic film by abrading the excess part of the film after the glazing has passed through the autoclave.

The edge brightness effect results from a reflection of incident sunlight off the reflective surface of the edge face of the thermoplastic film and which travels through the absence of screen printing at the edge of the glazing which is used to create the aforementioned opaque band. The edge brightness phenomenon is explained in FIG. 2 which illustrates a local section through the edge of a laminated glazing: the exterior sheet of glass is referenced 1, the interior sheet of glass 3, the thermoplastic film 2, the opaque band 4. Also depicted are an incident ray of light I which gives rise to a reflected ray of light R that contributes to the edge brightness effect. The fact that the edge face of the thermoplastic sheet made of PVB or similar is reflective is associated with the fact that, in the autoclave, the thermoplastic material softens and the edge face has a tendency to "self-level", or alternatively from the fact that it has been trimmed off with a knife after passing through the autoclave.

In practice, for esthetic reasons, it is desirable to avoid the edge brightness effect manifesting itself in the form of one or more bright segments along the edge of the glazing and visible to an observer. Such a case is illustrated in FIG. 1 which shows a laminated glazing 10 viewed face-on: the bright segments are symbolized in the form of thicker lines referenced S.

The solution generally preferred for eliminating or limiting this disadvantage is to make the edge face of the thermoplastic film light-scattering by giving it a fine texture using abrasion. To do that, the thermoplastic film has an excess that protrudes beyond the edge of the sheets of glass along the periphery of the glazing before passing through the autoclave and which is still present after the passage through the autoclave: cf. FIG. 3 which shows a local section similar to FIG. 2 but in which the thermoplastic film 4 has an excess E before abrasion. The glazing is then taken up by a robot which offers the periphery of the glazing up to abrasive bands—cf. FIG. 4, where an abrasive band is referenced B—which remove the excess thermoplastic film while at the same time giving the edge face a light-scattering matt appearance: cf. FIG. 5 which is similar to FIG. 2 but in which the edge face of the thermoplastic film 2 scatters the incident ray of light I rather than reflecting it.

However, this solution is not well suited to the case of laminated glazings having a very thin interior sheet of glass because the latter would break upon contact with the abrasive band. It is possible to resort to other solutions, such as that of applying the opaque band all the way to the edge of the glazing (so that it then blocks incident rays of light) or of forming the thermoplastic film so that it is recessed between the two sheets of glass (in which case the incident rays will be able to reflect directly off the interior sheet of glass, producing a reflection that is uniform along the edge of the glazing which then does not have a discontinuous and unattractive nature). However, these solutions also have disadvantages: the first makes the method of applying the opaque band by screen printing noticeably more complicated, while the second allows a buildup of dirt and the growth of moss in the peripheral groove of the glazing between the two sheets of glass after the glazing has been mounted on the motor vehicle, thus giving it an unattractive appearance.

But above all, the Applicant Company has become aware that the problem of the fragility of the interior sheet of glass with respect to mechanical knocks applied to its edge face remains even after the laminated glazing has been produced, unlike the case of impacts applied to its main surface. Specifically, if the laminated glazing experiences a mechanical knock to its edge face, this knock may be experienced by the edge face of the interior sheet of glass, given that the edges of the exterior and interior sheets of glass are usually juxtaposed at the one same level. Now, laminated glazings are liable to experience knocks to their edge face even once they have been mounted in their end-use application. For example, on a motor vehicle, this may be the case with the opening side window glazings which are not guided on their visible part, of fixed side window glazings with visible edges, or even in the case of opening back window glazings.

It is the object of the present invention to at least partially alleviate the aforementioned disadvantages.

According to one aspect, the invention seeks more particularly to limit the risk of breakage of laminated glazings with a very thin sheet of glass which breakages are caused by potential mechanical knocks to the edge face of the glazings. To this end, the present invention proposes a laminated glazing, notably a laminated glazing for an automotive application, comprising: a first sheet of glass and a second sheet of glass, and a polymer interlayer positioned between the first sheet of glass and the second sheet of glass. The second sheet of glass has a thickness of less than 1.2 mm, the first sheet of glass has a thickness greater than that of the second sheet of glass. The edge of the second sheet of glass is recessed with respect to the edge of the first sheet of glass over at least part of the periphery of the glazing.

In the part of the periphery of the glazing in which the edge of the second sheet of glass is recessed with respect to the edge of the first sheet of glass, mechanical knocks to the edge face of the glazing are not applied to the edge face of the second sheet of glass, which is therefore protected, unlike the case of the prior art in which the edge of the thick sheet of glass and of the thin sheet of glass are usually juxtaposed at the one same level. Such knocks are experienced on the edge face of the first sheet of glass, which is stronger than the second sheet of glass because of its greater thickness.

This recessing may be limited to one or more portions of the periphery of the glazing. It is preferably applied to those portions which are most exposed to the risk of knocks to the edge face of the glazing after mounting in its end-use application. For example, considering the case of automotive vehicle glazing, the recessing may be performed on that one or those of the peripheral sides of the glazing where the edge face thereof remains visible and accessible after mounting on the vehicle—and therefore liable to be subjected to a knock to their edge face during the course of the life of the vehicle—whereas it would not be applied to the other peripheral side or sides where the edge face of the glazing is protected against knocks, for example by the bodywork of the vehicle. The same is applicable mutatis mutandis to the case where just part of the edge of a peripheral side of the glazing thus remains exposed to knocks following mounting in the end-use application.

Of course, it is preferable to generalize the recessing to the entire periphery of the glazing when the entire periphery remains exposed to knocks to the edge face after mounting in the end-use application.

However, it is advantageous to generalize the recessing to the entire periphery of the glazing even in cases in which the edge face of the glazing is protected over all or part of the periphery after mounting in its end-use application. This is because this precaution makes it possible to protect the glazing against mechanical knocks to its edge face throughout that part of its life cycle that extends from the operation of assembling the glazing to the mounting thereof in its end-use application. During this period, the glazing is subject to handling or operations such as conveying, stacking on pallets, transport, storage, mounting in its end-use application, during which operations the risk of knocks to the edge face cannot be excluded.

In addition, the recessing advantageously makes it possible to resort to a manual or automated operation of using a knife to trim off the marginal part of the thermoplastic film that extends beyond the periphery of the glazing after the sheets of glass and the thermoplastic sheet have been assembled, without the risk of the knife impacting against the edge face of the second sheet of glass.

When such glazing is used in an automotive application, it will be appreciated that the first sheet of glass constitutes the exterior sheet of glass of the glazing whereas the second sheet of glass constitutes the sheet of glass on the inside of the cabin of the vehicle.

As already mentioned, in the prior art, the edges of the sheets of interior and exterior glass are usually juxtaposed at the one same level, which means to say on the one same perpendicular to the main surface of the sheets of glass. As an exception, laminated glazings in which the edge of one sheet of glass is recessed with respect to that of another sheet of glass have already been described, but not with a view to protecting the edge face of a very thin sheet of glass against knocks.

This is the case in EP 0 418 123 A1 and EP 0 600 766 A1 which disclose laminated glazings in which all of the constituent sheets of glass are thick, unlike the laminated glazing according to this aspect of the invention which comprises a sheet of glass of a thickness less than or equal to 1.2 mm. For the very reason that the constituent sheets of glass and resulting laminated glazing are very thick, the recessing in these documents is disclosed with a view to thinning-down the glazing at its periphery and thus allowing the edge of the glazing to be mounted in the mounting and guiding elements of the car doors which were designed for earlier monolithic glazing.

WO 00/61366 A1 discloses a glazing that is partially laminated so that non-transparent elements such as photovoltaic cells can be incorporated into it. The constituent sheets of glass are also thick and, as a result, recessing of the edge of the glazing is divulged in order to avoid differences in level at the periphery of the glazing where it rests on the bodywork, for assembly and weatherproofing reasons.

WO 2014/029605 A1 deals with the fixing of mechanical components in holes in laminated glazings, something which presents problems both with creating the holes and with relieving the fixing, because of the pressure exerted by the fixing system on the glazing. This is the case with side window glazing mounted so that it slides in car doors and that has a hole at the bottom for attaching the window driving components and also with back windows that have a hole in which to fix a wiper system. In order to avoid these problems, that document teaches the creation of the fixing hole in a region of the glazing in which the exterior sheet of glass is not covered by the interior sheet of glass. More particularly, it divulges a side window glazing having four peripheral sides and having a zone along the lower peripheral side of the glazing where the exterior sheet of glass is not covered by the interior sheet of glass. The fixing hole for the window driving components is made in this zone of the exterior sheet of glass prior to toughening and assembly with the other components of the glazing. By contrast, the invention according to the aspect described hereinabove is independent of any fashioning of the sheets of glass in order to fix any mechanical devices thereto. Thus, one distinctive feature of the laminated glazing lies in the fact that it has a peripheral side for which the entire region of the first sheet of glass that is not covered by the second sheet of glass which is contiguous with this peripheral side of the glazing is free of any hole. It is to be understood that this region is free of any hole, whether this hole is a through-hole or a blind hole.

The laminated glazing according to the invention also stands apart from the teaching of this document of the prior art through various preferred features. It will be appreciated that each of these preferred features can also be implemented independently of the aforementioned distinctive feature, whether individually or in combination with one or more others.

Such a preferred feature lies in the fact that the edge of the second sheet of glass is recessed with respect to the edge of the first sheet of glass over at least 30% of the periphery of the glazing, more preferably over at least 50% of the periphery of the glazing and more advantageously over at least 70% of the periphery of the glazing, or even more advantageously still, over the entire periphery of glazing. What is meant by the periphery of the glazing is the peripheral edge of the glazing.

Another of these preferred features lies in the fact that the glazing has a peripheral side for which the recessing distance is less than or equal to 10 mm for all of the—continuous or discontinuous—part of this peripheral side for which the edge of the second sheet of glass is recessed with respect to the edge of the first sheet of glass.

According to yet another of these preferred features, the glazing further comprises at least for said part of the periphery of the glazing, an opaque band running some distance from the edge of the first sheet of glass. This distance is preferably less than or equal to 2 mm.

According to yet another of these preferred features, the glazing has a peripheral side for which the entire region of the first sheet of glass that is not covered by the second sheet of glass which is contiguous with this peripheral side of the glazing is free of shaping in which to fix any mechanical device.

The laminated glazing according to the invention may further comprise one or more of the following preferred features which may also each be implemented independently of the aforementioned distinctive features:

the thickness of the first sheet of glass is at least 0.2 mm greater than that of the second sheet of glass, the first sheet of glass preferably having a thickness of at least 1 mm and more preferably of at least 1.4 mm and the second sheet of glass preferably having a thickness less than or equal to 1 mm and more preferably less than or equal to 0.7 mm;

the recessing distance is at least 1 mm, preferably at least 2 mm, and more preferably at least 3 mm;

for said part of the periphery of the glazing (which means to say the part for which the edge of the second sheet of glass is recessed with respect to the edge of the first sheet of glass), the edge of the second sheet of glass is recessed with respect to the edge of the polymer layer;

the recessing of the edge of the second sheet of glass with respect to the edge of the polymer layer is greater than 1 mm and more preferably greater than or equal to 1.5 mm;

the recessing of the edge of the second sheet of glass with respect to the edge of the polymer layer is less than 10 mm and more preferably less than 5 mm;

that part of the polymer layer which protrudes beyond the edge of the second sheet of glass has no additional thickness with respect to that part of the polymer layer that is sandwiched between the first and second sheets of glass or has an additional thickness corresponding at most to one third, more preferably at most to one quarter, and more preferably still at most to one tenth of the thickness of the second sheet of glass. Furthermore, it is preferable for this additional thickness to be less than or equal to one tenth of the thickness of that part of the polymer layer that is sandwiched between the two sheets of glass;

for said part of the periphery of the glazing, the edge of the polymer layer extends at an angle from the edge of the first sheet of glass, making an acute angle with the internal main surface of the first sheet of glass, the edge of the second sheet of glass being recessed with respect to the edge of the polymer layer;

said angle is, on the one hand, greater than 20°, preferably greater than 30°, and, on the other hand, less than 80°, preferably less than 60°;

for said part of the periphery of the glazing, the edge of the polymer layer is textured so as to scatter light preferably using an abrasion treatment;

for said part of the periphery of the glazing, the fact that the edge of the polymer layer extends at an angle from the edge of the first sheet of glass making an acute angle with the internal main surface of the first sheet of glass is preferably achieved by an abrasion treatment applied to the edge of the polymer layer; if appropriate, the edge of the polymer layer is texturized by this same abrasion treatment in order to make it scatter light;

for said part of the periphery of the glazing, the edge of the polymer layer is recessed with respect to the edge of the first sheet of glass;

for said part of the periphery of the glazing, the opaque band is arranged between the first sheet of glass and the second sheet of glass, the edge of the second sheet of glass being situated at an intermediate level between the exterior edge and the interior edge of the opaque band;

for said part of the periphery of the glazing, the opaque band is arranged between the first sheet of glass and the polymer layer, the edge of the polymer layer being situated at an intermediate level between the exterior edge and the interior edge of the opaque band;

the glazing comprises a seal arranged fixedly at least on said part of the periphery of the glazing;

the second sheet of glass has been treated by chemical toughening;

the glazing is glazing for an automotive vehicle, in particular;

a windshield; or a fixed side window glazing, preferably with an edge face that is visible and accessible when mounted in the motor vehicle; or a side window glazing intended to be mounted so that it slides in an automotive vehicle door, in which case said part of the periphery of the glazing (for which the edge of the second sheet of glass is recessed with respect to the edge of the first sheet of glass) preferably includes, at least partially—and more advantageously completely—that part of the edge of the glazing which becomes visible and accessible when the glazing is moved between its closed position and its open position in the door; or a back window, particularly a back window with an edge that is visible and accessible when mounted in the automotive vehicle and/or that has four peripheral sides with said part of the periphery of the glazing including at least in part—preferably in full—two peripheral sides of the glazing, more preferably three peripheral sides and more advantageously all four peripheral sides; or fixed glazing for automotive vehicle roof, preferably having at least part of its edge visible and accessible when mounted on the roof of the vehicle; or glazing forming a sliding sunroof of an automotive vehicle, in which case part of the periphery of the glazing (for which the edge of the second sheet of glass is recessed with respect to the edge of the first sheet of glass) includes preferably at least in part—and more advantageously in full—that part of the edge of the glazing that becomes visible and accessible when the glazing is moved between its closed position and its open position in the roof.

Another aspect of the invention relates to the use of such laminated glazing for an automotive vehicle application. According to yet another aspect, the invention relates to an automotive vehicle comprising such laminated glazing.

Another aspect of the invention relates to a method of producing a laminated glazing, comprising:

a first step consisting in preassembling the glazing by arranging and holding together a sheet that forms a polymer layer between a first sheet of glass and a second sheet of glass in such a way that, at least in part of the periphery of the glazing thus preassembled:
  the edge of the second sheet of glass is recessed with respect to the edge of the first sheet of glass, the dimensions of the second sheet of glass being smaller than those of the first sheet of glass,
  the edge of the polymer layer is recessed with respect to the edge of the first sheet of glass, and
  the edge of the second sheet of glass is flush with or recessed with respect to the edge of the polymer layer; then a second step consisting in treating the glazing thus preassembled in an autoclave in order to ensure the physicochemical bonding-together of the sheets of glass via the polymer layer, in which method the dimensions of the sheet that makes up the polymer layer are chosen with respect to the dimensions of the sheets of glass so that during the first step, in said part of the periphery of the glazing where the edge of the second sheet of glass is recessed with respect to the edge of the first sheet of glass, the polymer layer lies flush with or extends beyond the edge of the second sheet of glass but without extending beyond the edge of the first sheet of glass, taking into account the tolerance on the relative positioning of the sheet that makes up the polymer layer and the two sheets of glass.

The method thus makes it possible to contrive for the edge of the polymer layer never to be recessed with respect to the edges of the two sheets of glass, thereby avoiding the creation of a groove between the two sheets of glass, which is not desirable when the glazing is not provided with a peripheral seal, both from the standpoint of protecting the edge of the second sheet of glass against impact and from the standpoint of the risk of fouling of such a groove. It will be appreciated that this method can be implemented in order to obtain a glazing according to the invention described hereinabove, where appropriate exhibiting one or more of the preferred features mentioned hereinabove or which are mentioned in the description hereinafter of preferred embodiments of the invention provided, of course, that these are not incompatible with the method.

Further aspects, features and advantages of the invention will become apparent from reading the following description of preferred embodiments of the invention, which description is given by way of example and with reference to the attached drawing.

FIG. 1 schematically depicts an automotive vehicle windshield viewed face-on and illustrates the undesirable phenomenon of edge brightness in the form of several bright segments at the edge of a laminated glazing.

FIG. 2 is a local section through the edge of a laminated glazing and explains the edge brightness phenomenon.

Figure 3:
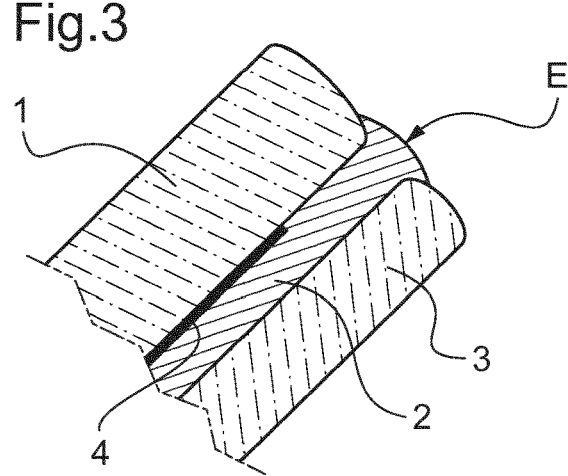
FIGS. 3 to 5 are local sections through the edge of a laminated glazing illustrating one solution for avoiding the edge brightness phenomenon.
Figure 4:
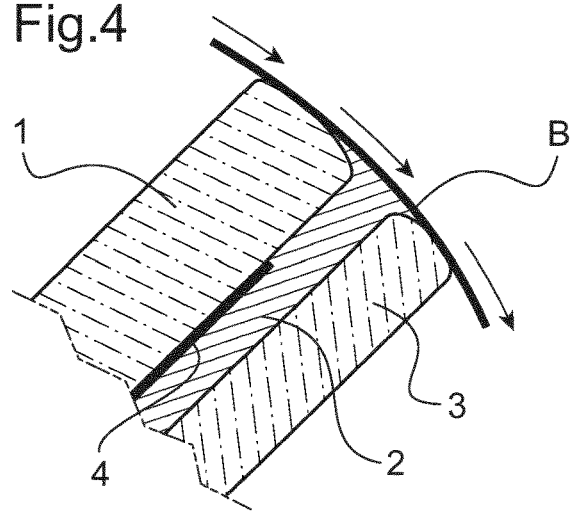
Figure 5:
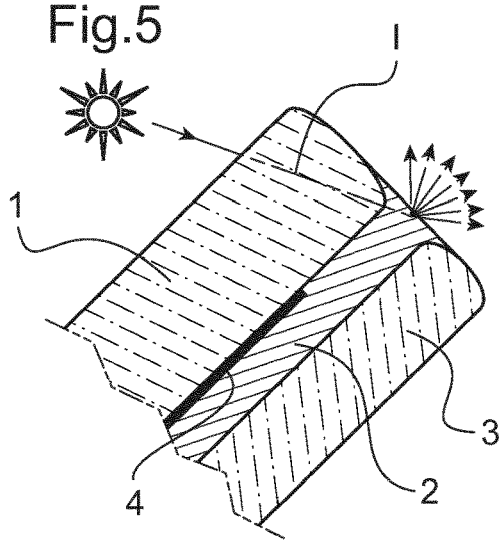
Figure 6:
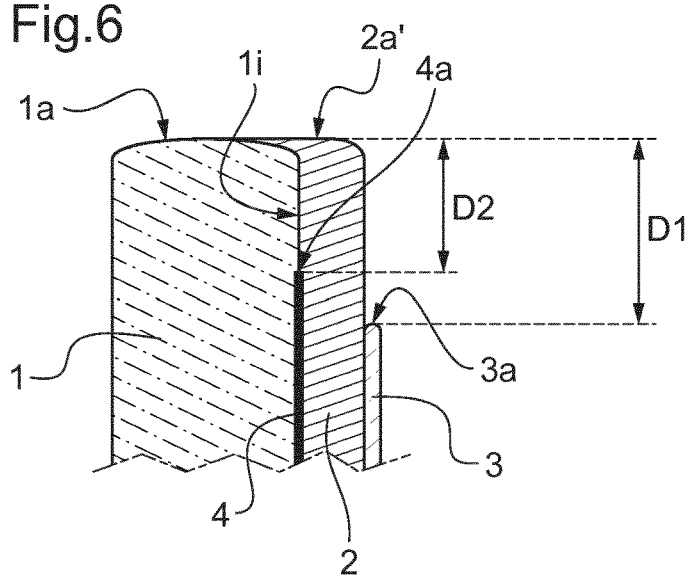
Figure 7:
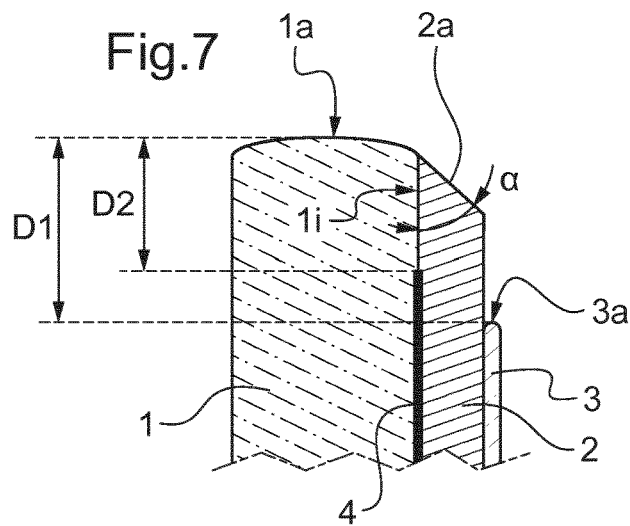

FIGS. 6 and 7 schematically depict, for an automotive vehicle windshield according to a first embodiment of the invention, a local section through the edge of the laminated glazing on the line of section A-A depicted in FIG. 1, respectively before and after the edge face of the polymer layer has been treated by abrasion in order to eliminate the edge brightness effect.

Figure 8:
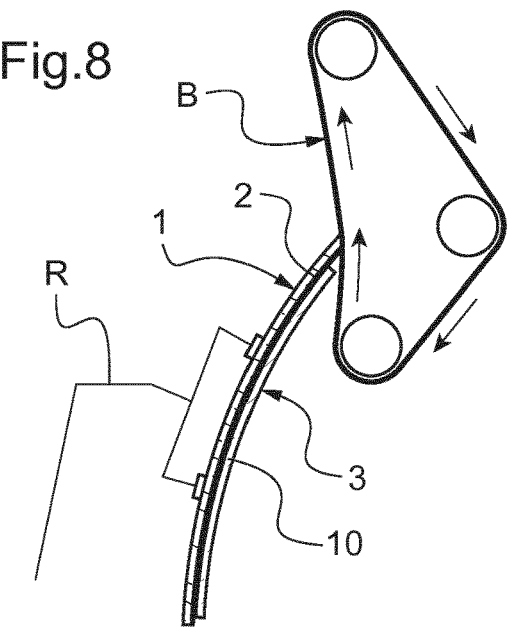

FIG. 8 illustrates a technique of abrading the edge face of the polymer layer of the glazing in order to obtain the glazing edge profile illustrated in FIG. 7.

FIG. 9 schematically depicts a local section taken through the edge of the laminated glazing on the line of section A-A depicted in FIG. 1, but according to a second embodiment of the invention.

FIG. 10 depicts a local section similar to FIG. 9, but corresponding to an alternative form of relative arrangement of the edges of the various constituent components of the laminated glazing.

FIGS. 11 and 12 illustrate a local section taken through the edge of the laminated glazing according to a third embodiment.

A first embodiment of an automotive vehicle windshield according to the invention will be described hereinafter with reference to FIGS. 6 to 8. The overview of the windshield is that of the windshield 10 in FIG. 1 which shows it in its mounted position on the motor vehicle. It comprises four peripheral sides, namely: a lower side 11, two lateral sides 12, 14 and an upper side 13.

Alternatively, it may be a laminated glazing for a motor vehicle other than a windshield, for example a side window glazing, whether intended to be mounted fixedly on the vehicle or mounted with the ability to slide in a door, a back window or alternatively a glazing for the sunroof of a vehicle, whether opening or fixed. In general, all these glazings have, when viewed face-on, a substantially polygonal outline—although with segments that are bowed—which very often involves four peripheral sides, although their overall shape differs. In the case of side window glazings, some have only three peripheral sides. In such applications, the glazing is generally curved, although it could equally be flat. More generally, the glazing may also be intended for applications other than automotive vehicles, in particular for aeronautical applications in which case it may have the shape of a disk—which amounts to having just one peripheral side within the meaning of the present invention—or for the building trade. The description that follows is applicable mutatis mutandis whatever the overall shape of the glazing or the end-use application thereof.

As is visible in FIG. 6, the glazing is a two-sheet laminate: it comprises a first sheet of glass 1 which constitutes the exterior sheet of glass of the windshield 10 and a second sheet of glass 3 which constitutes the interior sheet of glass.

The exterior and interior sheets of glass 1, 3 may be of conventional type. In the case of a more lightweight glazing, the exterior sheet of glass 1 preferably has a thickness chosen from the range from 1.4 mm to 2.1 mm. It may be thicker, for example up to 3.5 mm or even more, for particular applications where increased mechanical strength is desirable. Going the other way, the thickness of the exterior sheet of glass 1 may be less than 1.4 mm for certain particular applications where lower mechanical strength is acceptable, but it is preferably greater than or equal to 1 mm.

With a view to lightening the weight of the glazing, the interior sheet of glass 3 has a thickness less than 1.2 mm and more preferably less than or equal to 1 mm and more advantageously still, less than or equal to 0.7 mm.

The exterior sheet of glass 1 may either be subjected to a treatment that increases its surface mechanical strength using, for example, a conventional tempering or toughening heat treatment or subjected to a treatment of the annealing type, which means to say without applying significant compression to its surfaces as is usually the case with laminated windshields for automotive applications. Nevertheless, in both of the aforementioned cases, it is advantageous for the edge of the sheet of glass to be mechanically strengthened by applying edge compressive diaphragm stresses during production thereof.

The interior sheet glass 3 is preferably subjected to a treatment that increases its mechanical strength. Given its small thickness, treatment by chemical toughening is preferred, as it creates a surface region of the glass which is in compression whereas a central zone is under tensile stress. The technique of chemical toughening is known per se and reference may be made for example to the article: *Ion exchange for glass strengthening*, by René Gy in *Materials science & engineering*: B, vol. 149, No. 2, 25 Feb. 2008, Elsevier, ISSN: 0921-5107, pages 159-165. Of course, the composition of the sheets of glass 1, 3 is chosen to suit the treatments applied to them.

In a way known per se, a polymer interlayer 2 is positioned between the two sheets of glass 1, 3 and serves to bond them together. This may conventionally be a sheet of polyvinylbutyral (PVB) 0.76 mm thick. Alternatively, it may be any other suitable material such as a sheet of ethylen-evinyl acetate (EVA) or of polyurethane. Depending on the application of the glazing, it may even be a resin poured between the sheets of glass 1, 3 and then polymerized. The thickness of the polymer layer 2 may be different. It may also be made up of several superposed sheets of polymer which are made from the same material or from different materials.

The exterior edge 3a of the interior sheet of glass 3 is recessed with respect to the exterior edge 1a of the exterior sheet of glass 1 by a non-zero distance referenced D1. It is advantageous to create such recessing around the entire periphery of the glazing 10 because the entire periphery of the interior sheet of glass 3 is then protected from knocks to the edge face of the laminated glazing.

The recessing distance D1 may be small. However, it is preferably at least equal to 1 mm and more preferably at least equal to 2 mm, or even at least equal to 3 mm, making it easier to position the interior sheet of glass 3 so that it is recessed with respect to the exterior sheet of glass 1 when these sheets are being assembled given the positioning tolerances. The recessing distance D1 may be constant over the entire periphery of the glazing 10 but also may differ according to the side of the glazing.

In the case of a windshield, the glazing comprises an opaque band 4—conventionally black in color, but which could be different—running a short distance away from the periphery of the glazing 10 as illustrated in FIG. 1. This band 4 conventionally has the function of hiding the automotive vehicle bodywork underneath the edge of the glazing 10 and of protecting the bead of adhesive used to fix the glazing 10 to the bodywork against ultraviolet radiation. Conventionally, it may be achieved by a deposition of enamel—or of ink or of paint—by screen printing onto one or other of the sheets of glass. It is preferably applied to the internal face 1i of the exterior sheet of glass 1. Alternatively, the opaque band 4 is applied to one of the faces of the polymer interlayer 2, for example by application of ink as taught in WO 95/00329 A1. For the convenience of the operation of applying the enamel, ink or paint of which the band 4 is formed, this band extends so that it is recessed slightly—by a distance denoted D2—with respect to the edge 1a of the exterior sheet of glass 1. The distance D2 is preferably less than or equal to 2 mm, for esthetic reasons.

It is advantageous for the edge 3a of the interior sheet of glass 3 to be situated at an intermediate level between the exterior 4a and interior 4b edges of the band 4. That improves the esthetic appearance of the glazing because the edge 3a is not visible to the user through the absence of screen printing at the edge of the glazing. As a result, it is preferable for the recessing distance D1 to be less than or equal to 10 mm over the entire periphery of the glazing 1 or at the very least on the lateral sides 12, 14 and the top side 13 for which the opaque band 4 is generally the least wide. Independently of this consideration, it is preferably for the recessing distance D1 to be less than or equal to 10 mm at least over all of that part of the periphery of the glazing where its main surface is exposed to knocks so as to enjoy full benefit of the laminated nature of the glazing in this region.

During the assembling of the glazing, the exterior edge 2a' of the polymer interlayer 2 is not recessed with respect to the edge 1a of the exterior sheet of glass 1. After definitive assembly of the glazing 10—which means to say in this case after the autoclave treatment to ensure the physico-chemical bonding-together of the sheets of glass via the polymer layer 2—the edge 2a' of the polymer layer 2 undergoes an abrasion treatment illustrated in FIG. 8.

This abrasion treatment serves to texturize the edge face of the polymer layer 2 to make it scatter light rather than reflect, something which makes it possible to eliminate or substantially reduce the edge brightness effect. The abrasion operation is rendered possible because the edge 3a of the interior sheet of glass 3 is recessed with respect both to the edge 1*a* of the exterior sheet of glass 1 and to the edge 2*a*' of the polymer layer 2.

The abrasion operation can be performed as follows. The glazing 10 is handled by a robot arm R so that the edge 2*a*' makes contact with a circulating abrasive band B. Contact between the abrasive band B and the edge 2*a*' is inclined in such a way as to exclude or at least limit contact 1 with the exterior sheet of glass 1. This abrasion treatment may be performed by offering up to several abrasive bands with increasingly fine grit size in succession. The abrasive band B circulates in the direction passing from the polymer layer 2 toward the exterior sheet of glass 1, thereby avoiding the risk of delaminating the polymer layer 2 from the exterior sheet of glass 1.

After this abrasion treatment, the texturized edge of the polymer layer 2—referenced 2*a* in FIG. 7—is at an acute angle—referenced α—with respect to the internal main surface 1*i* of the first sheet of glass 1. In general, it is preferable for the angle α to be greater than 20°, or even greater than 30°. By contrast, it is preferable for it to be less than 80°, or even less than 60°. However, more generally, the angle α is chosen so that the edge 3*a* of the interior sheet of glass 3 is recessed with respect to the edge 2*a* of the polymer layer 2 so as to avoid the risk of contact of the abrasive band B with the edge 3*a* of the interior sheet of glass 3 during the abrasion operation.

The fact that the edge 2*a* thus extends at an angle is advantageous in comparison with the scenario in which it might be perpendicular—which means to say if the angle α measured 90° as in the prior art—because the risk of delamination of the polymer layer 2 from the exterior sheet of glass 1 subsequent to the manufacture of glazing is minimized and the effect of reducing or eliminating the edge brightness effect is increased.

A second embodiment of a laminated glazing is now described with reference to FIG. 9. It is based on the first embodiment—the same reference numerals being used to denote the same elements—and its entire description is applicable, apart from the following differences.

In this embodiment, the edge 2*a* of the polymer layer 2 is recessed—by a non-zero distance denoted D3—with respect to the edge 1*a* of the exterior sheet of glass 1 in the glazing 10 in the finished state. This recessing alone makes it possible to limit the risk of edge brightness independently of any potential treatment of the edge 2*a* to render it non-reflective. Such treatment of the edge 2*a* can therefore be omitted in this embodiment.

It is preferable for the recessing distance D3 to be less than the distance D1 by which the edge 3*a* is recessed. That then avoids a groove being defined between the sheets of glass 1, 3 on the edge face of the glazing and which could be liable to fouling once the glazing is in place on the motor vehicle. The recessing of the edge 3*a* of the interior sheet of glass 3 with respect to the edge 2*a* of the polymer layer 2—in other words (D1-D3)—is preferably greater than 1 mm, or even greater than or equal to 1.5 mm. By contrast, it is preferable for this recessing (D1-D3) to be less than 10 mm, or even less than 5 mm, thereby limiting the size of the free surface of the polymer layer 2 which is exposed to aging and which may also have a troublesome sticky nature. It will be appreciated that, by convention, this recessing is measured by using as reference for the edge 2*a* of the polymer layer 2 the point thereof which is highest—that is to say furthest away—with respect to the edge 3*a* of the interior sheet of glass 3, it being recalled that the edge 2*a* is generally at an angle curving toward the edge 3*a* of the interior sheet of glass 3 because of the softening of the polymer layer 2 during the treatment in the autoclave. In practice, the uppermost point of the edge 2*a* of the polymer layer 2 is usually the point at which the edge 2*a* of the polymer layer 2 meets the internal surface of the exterior sheet of glass 1*a*: cf. this point which serves as a reference for the distance D3 in FIG. 9.

In any event, during the manufacture of glazing with a polymer layer 2 supplied in sheet form, it is preferable for the dimensions of the sheet of which the polymer layer 2 is made to be chosen to be larger than the interior sheet of glass 3 so that, after the glazing has been assembled, the polymer layer 2 is always flush with or protrudes beyond the edge of the interior sheet of glass 3, taking into account the tolerance on the relative positioning of the sheet of which the polymer layer 2 is made and the interior sheet of glass 3. This positioning tolerance is usually +/−1 mm. As a result, from a theoretical standpoint, it is advantageous to define a protrusion of the polymer layer 2 beyond the edge 3*a* of the interior sheet of glass 3 of at least 1 mm—but more preferably of at least 1.5 mm—thereby ensuring that the interior sheet of glass 3 will actually have a recessing (D1-D3) greater than or equal to 0 mm, or respectively greater than or equal to 0.5 mm, given the positioning tolerances. However, as mentioned hereinabove, provision may be made for an actual recessing (D1-D3) to be achieved that is even higher still, namely by at least 1 mm or even by more than 1.5 mm.

In this second embodiment, it is particularly advantageous for the recessing D3 of the edge 2*a* of the polymer layer 2 to be greater than the recessing D2 of the exterior edge 4*a* of the opaque band 4. This case is illustrated in FIG. 10. More specifically, the edge 2*a* of the polymer layer 2 is situated at an intermediate level between the exterior 4*a* and interior 4*b* edges of the band 4, which is also the case with the interior sheet of glass 3 as already mentioned above with regard to the first embodiment. As a result of this, the risk of edge brightness is completely eliminated and the esthetic appearance of the glazing is improved, given that neither the edge 3*a* of the interior sheet of glass 3 nor the edge 2*a* of the polymer layer is visible to the user through the absence of screen printing at the periphery of the glazing.

FIG. 11 illustrates a third embodiment according to the invention. It is based on the second embodiment, which means to say the one in which the edge 2*a* of the polymer layer 2 is also recessed with respect to the edge 1*a* of the exterior sheet of glass 1, irrespective of whether this is the variant of FIG. 9 or that of FIG. 10.

This third embodiment differs from the previous one only in that the glazing is provided with a seal 5 arranged fixedly at its periphery, for example by extrusion or by bonding. It is preferably arranged around the entire periphery of the glazing 10. The seal 5 makes it possible to eliminate the edge brightness effect and provides a perfect esthetic finish to the edge of the glazing seen from the side of the interior sheet of glass 3 because the edges 2*a* and 3*a* are hidden.

It may advantageously be made of rubber or of an elastomer or of some other material capable of absorbing mechanical knocks, in which case it also protects the edge 3*a* of the interior sheet of glass 3 against mechanical knocks.

As illustrated, the seal 5 may encapsulate the edge 2*a* of the polymer layer and the edge 3*a* of the interior sheet of glass 3. It may also be designed to cover, in full or in part, the edge 1*a* of the exterior sheet of glass 1, in which case it will also protect that against mechanical knocks.

FIG. 12 illustrates an alternative form of the layout of FIG. 11 in which the seal—referenced 5'—is also in contact with the edge 3a of the interior sheet of glass, but lies flush with the exterior face 3e of the interior sheet of glass 3. In other words, unlike the case with the seal 5 in FIG. 11, the seal 5' does not extend over the exterior face 3e.

In the third embodiment, provision may be made for the edge 2a of the polymer layer 2 to be recessed with respect to the edge 3a of the interior sheet of glass 3, thus creating a peripheral groove to improve the securing of the seal 5 or 5'.

The act of attaching a seal 5 or 5' by extrusion or bonding to the edge of the glazing as described for this third embodiment is preferable to the case in which a strip aimed at affording all or some of the functions mentioned for the seal 5 or 5' was produced on the edge 3a of the interior sheet of glass through an excess of material of the polymer layer 2 accumulating at this point during the process of manufacture of the glazing. This is because it is particularly difficult to master the creation of such a strip during the manufacturing process and in particular there is a risk of a lack of material or, on the other hand, of an excess of material for locally forming the strip, something which can in particular compromise the function of protecting the interior sheet of glass and the desired esthetic look. By contrast, the act of attaching a seal by bonding it or extruding it on the edge of the glazing does not present such difficulties.

Because of the aforementioned difficulties, it is preferable to avoid the creation of such a strip using the polymer layer 2. However, in cases where the polymer layer 2 comes in the form of a sheet, this sheet softens during the treatment in the autoclave to provide the physico-chemical bonding-together of the sheets of glass using the polymer layer 2, and the polymer may therefore flow and exhibit a slight increase in thickness in the part that protrudes beyond the edge 3a of the interior sheet of glass 3. Thus, both in the second embodiment described in relation to FIGS. 9 and 10—that is to say in the absence of an attached seal 5 or 5'—and in the third embodiment described in relation to FIGS. 11 and 12—which means to say the one in which the glazing is provided with an attached peripheral seal 5 or 5'—it is preferable that, after treatment in the autoclave, that part of the polymer layer 2 which may protrude beyond the edge 3a of the interior sheet of glass 3 should not exhibit an additional thickness in comparison with the part of the polymer layer 2 that is sandwiched between the exterior sheet of glass 1 and the interior sheet of glass 3 or at the very least that this additional thickness should be limited so that it corresponds at most to one third, more preferably at most to one quarter, and more preferably still, at most to one tenth of the thickness of the interior sheet of glass 3. Moreover, it is preferable for this additional thickness to be less than or equal to one tenth of the thickness of the part of the polymer layer sandwiched between the exterior sheet of glass 1 and the interior sheet of glass 3.

It will be appreciated that the local cross sections depicted in the figures for the various embodiments can be applied to all or part of the periphery of the laminated glazing. In addition, the recessing distances D1, D2, D3 and the angle α—as the case may be—may be identical or different for the various relevant peripheral sides of the glazing, while at the same time complying with the respective relationship between one another as mentioned.

Of course, the present invention is not restricted to the examples and embodiment described and depicted but can be varied in numerous ways accessible to those skilled in the art. In particular it will be appreciated that the laminated glazings according to the invention do not necessarily comprise an opaque band 4, for example in the case of a mobile side window glazing for an automotive vehicle door or in the case of applications to fields other than motor vehicles.

The invention claimed is:

1. A laminated glazing, comprising:
    a first sheet of glass and a second sheet of glass, and
    a polymer interlayer positioned between the first sheet of glass and the second sheet of glass,
in which:
    the second sheet of glass has a thickness of less than 1.2 mm,
    the first sheet of glass has a thickness greater than that of the second sheet of glass,
    an edge of the second sheet of glass is recessed with respect to an edge of the first sheet of glass over at least part of a periphery of the glazing, and
    the laminated glazing has a peripheral side for which a region of the first sheet of glass is not covered by the second sheet of glass, said second sheet of glass being contiguous with the peripheral side of the glazing, wherein said entire region of the first sheet of glass that is not covered by the second sheet of glass is free of a hole,
    wherein the laminated glazing further comprises at least for said part of the periphery of the glazing, an opaque band running some distance from the edge of the first sheet of glass, and
    wherein, for said part of the periphery of the glazing, the opaque band is arranged between the first sheet of glass and the second sheet of glass, the edge of the second sheet of glass being situated at an intermediate level between an exterior edge and an interior edge of the opaque band.

2. The glazing as claimed in claim 1, wherein the thickness of the first sheet of glass is at least 0.2 mm greater than that of the second sheet of glass.

3. The glazing as claimed in claim 1, wherein the edge of the second sheet of glass is recessed with respect to the edge of the first sheet of glass over the entire periphery of the glazing or over at least 30% of the periphery of the glazing.

4. The glazing as claimed in claim 1, wherein a recessing distance between the edge of the second sheet of glass and the edge of the first sheet of glass is at least 1 mm.

5. The glazing as claimed in claim 4, which has a peripheral side for which the recessing distance is less than or equal to 10 mm for the entire part of the peripheral side for which the edge of the second sheet of glass is recessed with respect to the edge of the first sheet of glass.

6. The glazing as claimed in claim 1, wherein, for the part of the periphery of the glazing, the edge of the second sheet of glass is recessed with respect to the edge of the polymer layer.

7. The glazing as claimed in claim 1, wherein, for said part of the periphery of the glazing, the edge of the polymer layer extends at an angle from the edge of the first sheet of glass, making an acute angle with an internal main surface of the first sheet of glass, the edge of the second sheet of glass being recessed with respect to the edge of the polymer layer.

8. The glazing as claimed in claim 7, wherein said angle is greater than 20° and less than 80°.

9. The glazing as claimed in claim 1, wherein, for said part of the periphery of the glazing, the edge of the polymer layer is textured so as to scatter light.

10. The glazing as claimed in claim 1, wherein, for said part of the periphery of the glazing, the edge of the polymer layer is recessed with respect to the edge of the first sheet of glass.

11. The glazing as claimed in claim 1, wherein, for said part of the periphery of the glazing, the opaque band is arranged between the first sheet of glass and the polymer layer, an edge of the polymer layer being situated at an intermediate level between an exterior edge and an interior edge of the opaque band.

12. The glazing as claimed in claim 1, further comprising a seal arranged fixedly at least on said part of the periphery of the glazing.

13. The glazing as claimed in claim 1, wherein the second sheet of glass has been treated by chemical toughening.

14. The glazing as claimed in claim 2, wherein the first sheet of glass has a thickness of at least 1 mm and the second sheet of glass has a thickness less than or equal to 1 mm.

15. The glazing as claimed in claim 14, wherein the first sheet of glass has a thickness of at least 1.4 mm and the second sheet of glass has a thickness less than or equal to 0.7 mm.

16. The glazing as claimed in claim 3, wherein the edge of the second sheet of glass is recessed with respect to the edge of the first sheet of glass over at least 50% of the periphery of the glazing.

17. The glazing as claimed in claim 4, wherein the recessing distance is at least 2 mm.

18. The glazing as claimed in claim 8, wherein said angle is greater than 30° and less than 60°.

\* \* \* \* \*